May 15, 1928.  
J. M. KING  
1,669,763

INTERNAL COMBUSTION ENGINE

Filed Feb. 23, 1924  3 Sheets-Sheet 1

INVENTOR.  
Joseph Marion King

May 15, 1928.  J. M. KING  1,669,763
INTERNAL COMBUSTION ENGINE
Filed Feb. 23, 1924   3 Sheets-Sheet 2
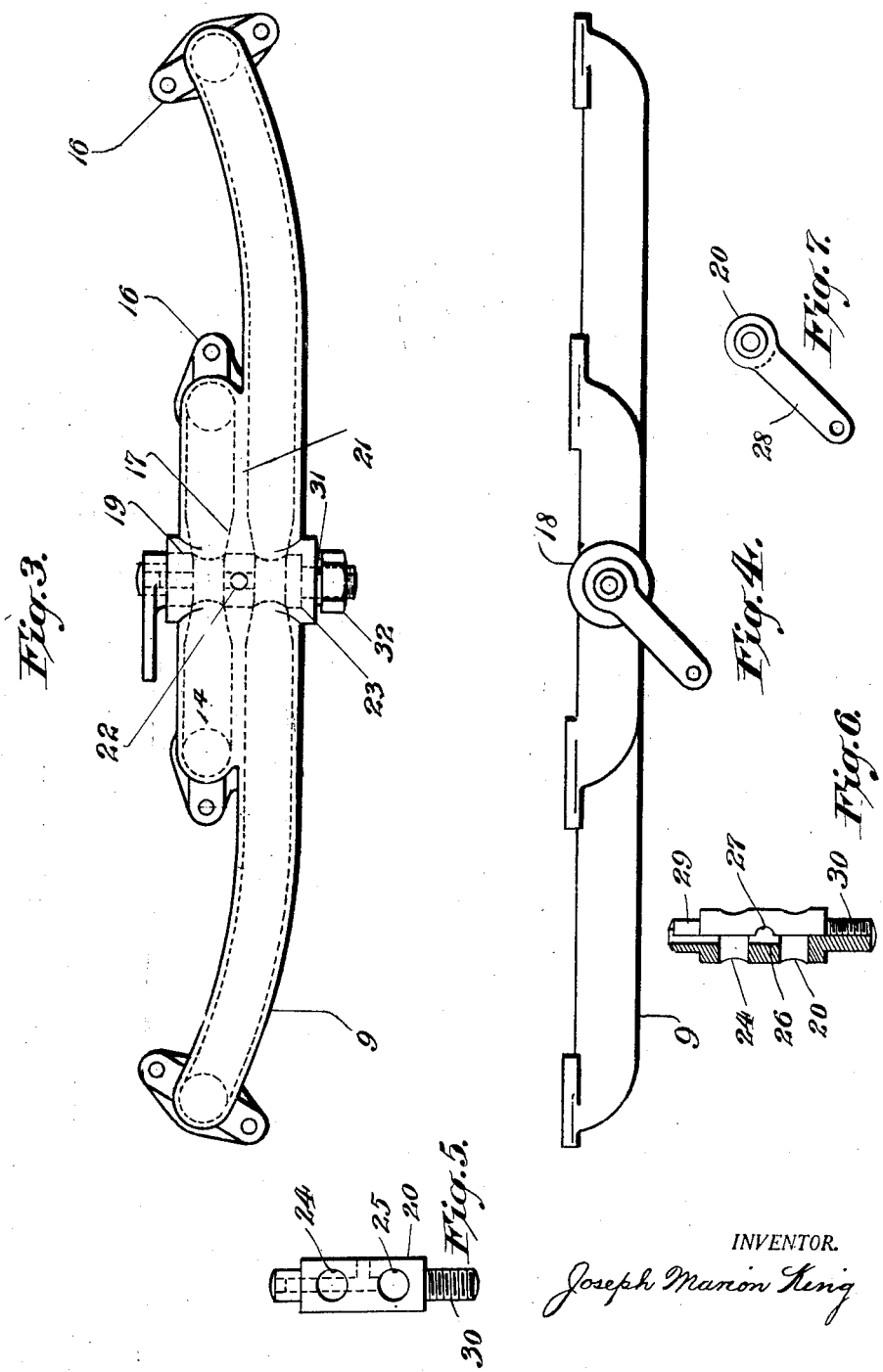
INVENTOR.
Joseph Marion King

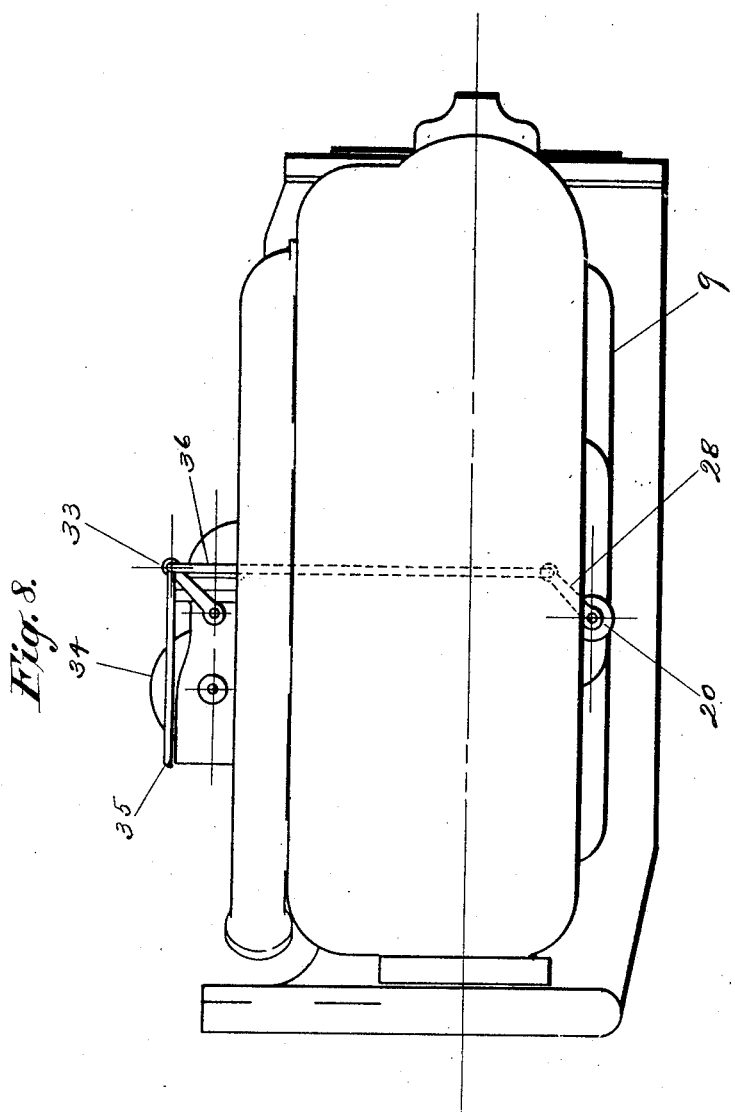

Patented May 15, 1928.

1,669,763

UNITED STATES PATENT OFFICE.

JOSEPH MARION KING, OF DETROIT, MICHIGAN.

INTERNAL-COMBUSTION ENGINE.

Application filed February 23, 1924. Serial No. 694,721.

My invention relates to internal combustion engines of the four-cycle type employing either gas or liquid fuel as a motive medium, and the objects thereof are as follows:

1. An increase of power per cylinder's total expansion volume, without restricting the size of its firing chamber.
2. Less weight of fuel per horsepower.
3. Less engine-weight per horsepower.
4. Greater facilitation of engine-ignition.
5. A nearer approach to ideal combustion.
6. Adaptability to utilize low grade fuels.

The invention contemplates the introduction of expended gases of a cylinder, whose piston has completed its firing stroke, into a cylinder, whose piston has simultaneously completed its fuel-mixture intake stroke. The invention further comprehends means to regulate the temperature of the expended gases as they are passing from the "work" to the "intake" cylinder by drawing in exterior air in consequence of Venturi effect, the said venturi being subjected to the pressure of the flowing gases.

It is well known to the art to which the invention appertains that the mean effective pressure of an engine of the usual type is dependent solely on the size of the firing chamber, which is a certain percentage of the total expansion volume of a cylinder, usually termed "clearance"; the smaller the "clearance" the greater the compression pressure and correspondingly the greater the mean effective pressure. In practice it has been found that a too small "clearance" would raise the pressure of the compressed fuel mixture to a point where the resultant heat would produce a "cracking" of the molecular structure of the fuel, and there being nitrogen present, explosive gases akin to TNT, would form and explode, thus causing "knocks" and excessive strains to the engine; hence the limitation with reference to the per cent of "clearance" that may be allowed the cylinder.

To overcome or arrest the explosion tendency in engines of high compression some manufacturers provide means to dilute the fuel-mixture charge with exhaust gases; while by so doing the object is accomplished the power of the engine is materially reduced by reason of the dilution. It is a fact, and one well known, that exhaust gases used in this manner will eliminate the "knocks" of an engine. Whether some atom of the product of combustion combines with a newly formed chemical design of the fuel after the disruption of the original molecule, or the effect of the water and $CO_2$ of the expended gases is catalytic, it is true the explosions cease and a smoothly running engine is the result.

It is observable that unusually high pressure may be imparted to the fuel-mixture by this method; the limit of the available pressure, however, is fixed by only the "kindling point" of the fuel and not by that degree of temperature which results in the rearrangement of the molecular pattern. The "kindling point" of petroleum motor fuel is near 1000° Fahrenheit. The "cracking" process is induced by a much less temperature.

It is axiomatic that the conservation of fuel is proportional to the increase of the compression pressure of the fuel charge, and likewise is the ignition and propagation of the flame facilitated, such increase-pressure contributing to a character of combustion more nearly approaching the preferred process, $H_2O + CO_2$.

It will be noted that the novel device herein disclosed, does not provide the introduction of the exhaust gases along with the fuel mixture, but is adapted to introduce the expended gases after the cylinder has taken in a full load of fuel; and it may be added that the influx of air produced by the Venturi effect referred to, will augment the fuel charge.

The objects enumerated and discussed are attained by the mechanism illustrated in the accompanying drawings of which Figure 1 is a view of a side elevation of an engine block, the head and pan removed, illustrating openings formed in the cylinders, flange pads and a novel expended gases manifold attached thereto embodying the invention.

Figure 3 is a side elevation of a preferable design of the expended gases manifold, illustrating a valve to regulate the fluid flow, and an inlet for air.

Figure 4 is a plan view of the expended gases manifold.

Figure 5 is a view in elevation of the fluid-regulating valve exhibiting two lateral holes adapted to control the flow of gases for a four-cylinder engine, and illustrating with dotted lines an air passage therein and an air inlet thereto.

Figure 6 is a view in elevation of the fluid valve rotated through an arc of 90°, with reference to Figure 5, and partially in section, illustrating the gas and air passages respectively and their relative location.

Figure 7 is a plan view of the fluid valve and a lever mounted thereon, the said lever being adapted to coact, by means of a link, not shown, with the carburetting control valve of an engine, not shown.

Figure 8 is a plan view of an engine equipped with the novel expended gases manifold, illustrating the means by which coaction is obtained between the throttling valve of a carbureter and the fluid-flow regulating valve of the expended gases manifold.

In the detail description which follows it is to be understood that like designating numerals in the drawings refer to like parts.

Figure 2:
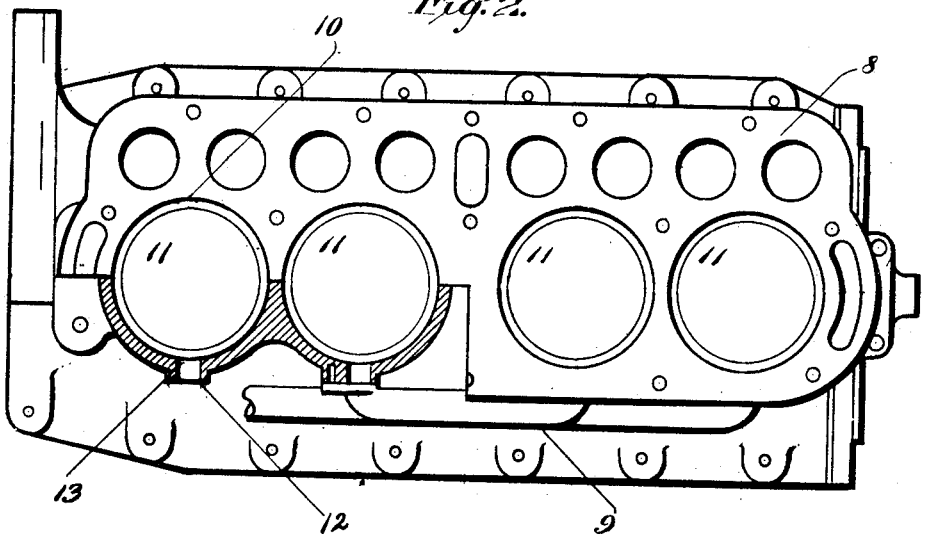
Figure 2 is a plan view of the engine block and novel manifold, exhibiting a partial section of the engine on the line A—A of Figure 1, illustrating the expended-gases openings which register with the ports, respectively, of the novel manifold.
Figure 1:
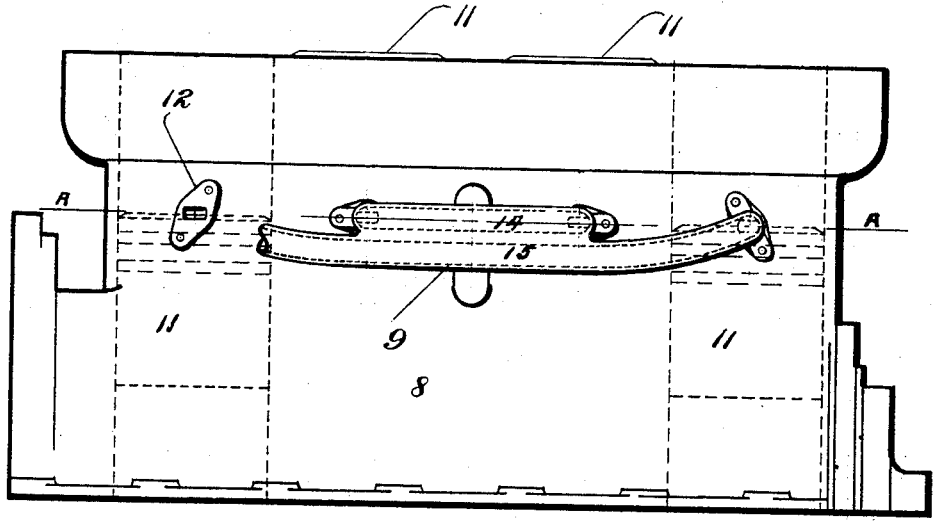

The Figure 1 represents a four-cylinder engine block, illustrating the side opposite to that of the valve side, and a novel expended gases manifold 9 attached thereto; on the outer wall of each cylinder 10 and on a line coinciding with the termini of the downward stroke of the pistons 11, is formed a flange pad 12 in which is machined, laterally, a port 13, communicable with the interior and exterior of the cylinder.

The manifold 9 comprises two conduits integrally formed, the one 14 connecting the two inside cylinders and the other 15 connecting the two outside cylinders; suitable flange connections 16 are cast on the open ends, respectively, of conduits 14 and 15 and are adapted to be attached by cap-bolts, to the flange pads 12 and held therewith in fluid-tight relation. The ports 13 being connective with the conduits 14 and 15, passages are thus provided for the flow of the expended gases from cylinders whose pistons have completed their firing strokes to cylinders whose pistons have simultaneously completed their fuel-mixture intake strokes.

At approximately, the center of the manifold 9 the conduits 14 and 15 are, respectively, contracted to cause a Venturi effect 17; a boss 18, annular in form is vertically formed on the center referred to and an circular recess 19 is vertically made therein and adapted to constitute a seat for a fluid control valve 20; a partition wall 21 separates the two conduits, 14 and 15, and, positioned on the said wall 21, on the vertical center of the manifold 9, is provided an air opening 22 communicable with the exterior and also with the recess 19; a shoulder 23 is machined in the lower end of the recess 19 to provide a stop for the valve 20.

Valve 20 is cylindrical in form and is provided with two holes, 24 and 25 laterally machined through its center and therein positioned, so that their centers coincide with the centers of the conduits 14 and 15 respectively; a concentric, longitudinal air passage 26 is formed in the valve between the holes 24 and 25 and made connective therewith; an opening 27 is laterally machined in the valve 20 at a point centrally between the holes 24 and 25 and at right angles thereto; the said opening 27 being formed to communicate with the air passage 26 of the valve is also adapted to register with the air opening 22 of the manifold.

A lever 28 is rigidly mounted on the top end 29 of the valve 20 and is adapted to coact with the throttle valve, not shown, of a carbureter; the valve 20 may, however, be operated independently of the coaction referred to or actuated automatically by an engine, or may also coact with means to regulate the fuel supply of a carbureter; the end 30 of the valve 20 is threaded and a spring washer 31 and a nut 32 are applied thereon and adapted to hold with yielding resistance the valve against its seat.

The throttle valve lever 33 of a carbureter 34 is provided with a control rod 35 and also a link rod 36, the link rod 36 being workably attached to the throttle valve lever 33 and also to the lever 28 of the valve 20 of the expended gases manifold.

It will be noted that by this arrangement a movement of the throttle valve lever 33 will cause a corresponding movement of the lever 28 and the valve 20.

The manner of operation is as follows:

When the novel manifold is attached to an engine or the invention incorporated therein, it is to be understood that the carbureter throttling valve is designed to coact with the expended gases valve 20, so that when the throttling valve is closed to the "idling" position the valve 20 will also be closed, thus preventing the flow of the gases from one cylinder to the other. By this arrangement low "idling" and easy starting are obtained.

It will be observed that when the throttling valve of the carbureter is moved from the "idling" position the valve 20 coactively opens and permits the flow of expended gases as described; and that the amount of gases flowing from the "work" to the "intake" cylinder will be in proportion to the opening of the carbureter throttling valve which regulates the speed of the engine. It is therefore evident that the pressure of the compressed fuel charge will vary correspondingly with the functioning of the coacting valves.

When the valve 20 is brought into action by the movement of the throttling valve, the exterior air, in consequence of the Venturi function of the contracted portions of the conduits, will be drawn into the gas passage and will exert a cooling effect on the gases; the air being capable of supporting combustion, will then enter into the chemical reaction which follows.

It is obvious that the device herein described and illustrated, may be modified without affecting the merit of the invention; I therefore pray to be protected in the essence of the invention as specified in the description and drawings and pointed out in the appended claims.

What I claim as new is,

1. In an internal combustion engine, a fluid conduit communicable with the interior of the cylinders at approximately the termini of the pistons' outward stroke adapted to provide a passage for the explosion gases from a fired cylinder to one charged with a fuel-mixture, a valve therein to admit and regulate the flow of the said gases and means coacting with the engine's fuel-mixture throttling valve to actuate the aforesaid valve.

2. In an internal combustion engine, a fluid conduit communicable with the interior of the cylinders at approximately the termini of the pistons' outward stroke adapted to provide a passage for the explosion gases from a fired cylinder to one charged with a fuel-mixture and a valve therein to admit and regulate the flow of air.

3. In an internal combustion engine, a fluid conduit communicable with the interior of the cylinders at approximately the termini of the pistons' outward stroke adapted to provide a passage for the explosion gases from a fired cylinder to one charged with a fuel-mixture, a valve therein to admit and regulate the flow of air and means coacting with the engine's fuel-mixture throttling valve to actuate the aforesaid valve.

4. In an internal combustion engine, a fluid conduit communicable with the interior of the cylinders at approximately the termini of the pistons' outward stroke adapted to provide a passage for the explosion gases from a fired cylinder to one charged with a fuel-mixture and means therein to induce air and to regulate the flow of fluid.

5. In an internal combustion engine, a fluid conduit communicable with the interior of the cylinders at approximately the termini of the pistons' outward stroke and adapted to provide a passage for the explosion gases from a fired cylinder to one charged with a fuel-mixture, a valve therein to admit and regulate the flow of air and to also regulate the flow of explosion gases and means coacting with the throttle valve of a carbureter to actuate the said regulating valve.

JOSEPH MARION KING.